(12) United States Patent
Burdgick et al.

(10) Patent No.: US 10,047,865 B2
(45) Date of Patent: Aug. 14, 2018

(54) STEAM TURBINE ROTOR SEAL RADIAL KEY MEMBER, RELATED ASSEMBLY AND STEAM TURBINE

(71) Applicant: General Electric Company, Schenectady, NY (US)

(72) Inventors: Steven Sebastian Burdgick, Schenectady, NY (US); James Royce Howes, Hermon, ME (US); Sean Christopher Morrissey, Schenectady, NY (US); Xiaoqing Zheng, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 337 days.

(21) Appl. No.: 14/960,961

(22) Filed: Dec. 7, 2015

(65) Prior Publication Data

US 2017/0159477 A1    Jun. 8, 2017

(51) Int. Cl.

| | |
|---|---|
| *F01D 11/00* | (2006.01) |
| *F01D 5/02* | (2006.01) |
| *F16B 3/04* | (2006.01) |
| *F01D 11/02* | (2006.01) |
| *F16J 15/3268* | (2016.01) |

(Continued)

(52) U.S. Cl.
CPC .......... *F16J 15/3268* (2013.01); *F01D 11/001* (2013.01); *F16J 15/4472* (2013.01); *F01D 5/3038* (2013.01); *F05D 2220/31* (2013.01); *F05D 2260/36* (2013.01)

(58) Field of Classification Search
CPC ...... F01D 11/006; F01D 11/001; F01D 11/02; F01D 5/02; F01D 25/24; F16J 15/4472; F16J 15/3288; F16J 15/3292; F05D 2220/31; F05D 2260/30; F05D 2240/56; F05D 2240/59; F05D 2240/55; F16B 3/04
USPC ........... 416/204 A; 415/173.7; 277/373, 372, 277/366, 367
See application file for complete search history.

(56) References Cited

U.S. PATENT DOCUMENTS

| | | |
|---|---|---|
| 3,096,074 A | 7/1963 | Pratt et al. |
| 4,304,523 A | 12/1981 | Corsmeier et al. |

(Continued)

FOREIGN PATENT DOCUMENTS

EP    1 584 794 A1    10/2005

OTHER PUBLICATIONS

Zheng, X., et al., "Rotating brush seal with bristle shield," GE co-pending U.S. Appl. No. 15/237,692, filed Aug. 16, 2016.

(Continued)

*Primary Examiner* — Jason Shanske
*Assistant Examiner* — Topaz L Elliott
(74) *Attorney, Agent, or Firm* — Ernest G. Cusick; Hoffman Warnick LLC (57) ABSTRACT

Various embodiments include a rotor key member, along with a related assembly and steam turbine. Particular embodiments include a rotor key member for radially retaining a circumferential seal in a steam turbine rotor body, the rotor key member including: a main body sized to contact an axial face of the circumferential seal; and a hook extending from the main body in a direction axially away from the circumferential seal, the hook sized to substantially complement a corresponding shelf in the steam turbine rotor body to restrict movement of the circumferential seal relative to the steam turbine rotor body.

17 Claims, 9 Drawing Sheets

(51) Int. Cl.
  *F16J 15/447* (2006.01)
  *F01D 5/30* (2006.01)

(56) References Cited

U.S. PATENT DOCUMENTS

| | | | |
|---|---|---|---|
| 4,846,628 A | 7/1989 | Antonellis | |
| 5,236,302 A | 8/1993 | Weisgerber et al. | |
| 5,318,405 A * | 6/1994 | Meade | F01D 5/3015 |
| | | | 416/220 R |
| 5,622,475 A | 4/1997 | Hayner et al. | |
| 6,106,234 A | 8/2000 | Gabbitas | |
| 7,371,050 B2 | 5/2008 | Pasquiet | |
| 7,566,201 B2 | 7/2009 | Brillert et al. | |
| 8,105,041 B2 | 1/2012 | Brillert et al. | |
| 8,888,460 B2 | 11/2014 | Ahaus et al. | |
| 9,327,368 B2 | 5/2016 | Hagan | |
| 9,835,253 B2 * | 12/2017 | Aksit | F16J 15/3288 |
| 2011/0176923 A1 | 7/2011 | Haffner | |
| 2012/0251303 A1 | 10/2012 | Zheng et al. | |
| 2012/0288361 A1 | 11/2012 | Lu et al. | |
| 2017/0089215 A1 | 3/2017 | Zheng et al. | |

OTHER PUBLICATIONS

Extended European Search Report and Opinion issued in connection with corresponding EP Application No. 16201569.7 dated Apr. 3, 2017.

U.S. Appl. No. 14/960,987, Office Action 1 dated Feb. 7, 2018, 15 pages.

U.S. Appl. No. 14/960,948, Office Action dated Feb. 8, 2018, 19 pages.

U.S. Appl. No. 14/960,975, Office Action dated Feb. 8, 2018, 18 pages.

U.S. Appl. No. 14/960,975, Notice of Allowance dated May 22, 2018, 5 pages.

U.S. Appl. No. 14/960,948, Notice of Allowance dated Jun. 6, 2018, 16 pages.

U.S. Appl. No. 14/960,987, Notice of Allowance dated Jun. 12, 2018, 10 pages.

* cited by examiner

STEAM TURBINE ROTOR SEAL RADIAL KEY MEMBER, RELATED ASSEMBLY AND STEAM TURBINE

BACKGROUND OF THE INVENTION

The subject matter disclosed herein relates to steam turbines. Specifically, the subject matter disclosed herein relates to seal devices in steam turbines.

Steam turbines include static nozzle assemblies that direct flow of a working fluid into turbine buckets connected to a rotating rotor. The nozzle construction (including a plurality of nozzles, or "airfoils") is sometimes referred to as a "diaphragm" or "nozzle assembly stage." Steam turbine diaphragms include two halves, which are assembled around the rotor, creating horizontal joints between these two halves. Each turbine diaphragm stage is vertically supported by support bars, support lugs or support screws on each side of the diaphragm at the respective horizontal joints. The horizontal joints of the diaphragm also correspond to horizontal joints of the turbine casing, which surrounds the steam turbine diaphragm.

Steam turbines utilize seals between rotor components and stator components, typically radially outward of the rotor bucket tip and radially inward of the diaphragm nozzle cover (stator). While some seals are formed as teeth on the rotor and/or stator, other configurations include a circumferential (or, rotating) seal that is located within a circumferential dovetail slot in the rotor. These rotating (circumferential) seals present unique design constraints, including, radial retention, rotation control, circumferential locking, and consistency of sealing across the circumference.

BRIEF DESCRIPTION OF THE INVENTION

Various embodiments include a rotor key member, along with a related assembly and steam turbine. Particular embodiments include a rotor key member for radially retaining a circumferential seal in a steam turbine rotor body, the rotor key member including: a main body sized to contact an axial face of the circumferential seal; and a hook extending from the main body in a direction axially away from the circumferential seal, the hook sized to substantially complement a corresponding shelf in the steam turbine rotor body to restrict movement of the circumferential seal relative to the steam turbine rotor body.

A first aspect of the disclosure includes a rotor key member for radially retaining a circumferential seal in a steam turbine rotor body, the rotor key member including: a main body sized to contact an axial face of the circumferential seal; and a hook extending from the main body in a direction axially away from the circumferential seal, the hook sized to substantially complement a corresponding shelf in the steam turbine rotor body to restrict movement of the circumferential seal relative to the steam turbine rotor body.

A second aspect of the disclosure includes a steam turbine rotor assembly having: a rotor body having a slot extending substantially entirely circumferentially about a primary axis of the rotor body, the slot including: a primary slot extending substantially an entire circumferential distance about the rotor body; and a secondary slot extending axially from the primary slot and spanning only a portion of the circumferential distance about the rotor body; a circumferential seal within the primary slot spanning substantially the entire circumferential distance about the rotor body; a set of seal retaining members within the primary slot contacting an axial face of the circumferential seal; and a first rotor key member having: a main body sized to contact an axial face of the circumferential seal; and a hook extending from the main body in a direction axially away from the circumferential seal, the hook sized to substantially complement a corresponding shelf in the primary slot.

A third aspect of the disclosure includes a steam turbine having: a casing; and a rotor assembly at least partially contained within the casing, the rotor assembly having: a rotor body having a slot extending substantially entirely circumferentially about a primary axis of the rotor body, the slot including: a primary slot extending substantially an entire circumferential distance about the rotor body; and a secondary slot extending axially from the primary slot and spanning only a portion of the circumferential distance about the rotor body; a circumferential seal within the primary slot spanning substantially the entire circumferential distance about the rotor body; a set of seal retaining members within the primary slot contacting an axial face of the circumferential seal; and a first rotor key member having: a main body sized to contact an axial face of the circumferential seal; and a hook extending from the main body in a direction axially away from the circumferential seal, the hook sized to substantially complement a corresponding shelf in the primary slot.

BRIEF DESCRIPTION OF THE DRAWINGS

These and other features of this invention will be more readily understood from the following detailed description of the various aspects of the invention taken in conjunction with the accompanying drawings that depict various embodiments of the disclosure, in which.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

The subject matter disclosed herein relates to steam turbines. Specifically, the subject matter disclosed herein relates to rotating seals in steam turbines.

According to various embodiments of the disclosure, a device (e.g., key member) is configured to lock/unlock a circumferential (rotatable) seal in a steam turbine, both radially retaining the seal as well as preventing rotation. Conventional approaches to retain circumferential seals allow for unwanted rotation, and are also susceptible to slipping and creep, which can both diminish the effectiveness of the seal and wear on the seal and adjacent components. In contrast to these conventional approaches, various embodiments include a radial key member sized to engage a key slot within the rotor body and radially retain an adjacent circumferential seal. In some cases, the radial key member is located between circumferentially disposed seal retaining members. In additional embodiments, a second key member is used to lock the radial key member in place and retain the rotating seal in the circumferential dimension. The radial key member can include at least one axially extending hook sized to engage the slot in the rotor body. The radial key member has a sufficient axial width to contact both the circumferential seal and the axially facing wall of the key slot in the rotor body.

As denoted in these Figures, the "A" axis represents axial orientation (along the axis of the turbine rotor, sometimes referred to as the turbine centerline, omitted for clarity). As used herein, the terms "axial" and/or "axially" refer to the relative position/direction of objects along axis A, which is substantially parallel with the axis of rotation of the turbomachine (in particular, the rotor section). As further used herein, the terms "radial" and/or "radially" refer to the relative position/direction of objects along axis (r), which is substantially perpendicular with axis A and intersects axis A at only one location. Additionally, the terms "circumferential" and/or "circumferentially" refer to the relative position/direction of objects along a circumference (c) which surrounds axis A but does not intersect the axis A at any location. Identically labeled elements in the Figures depict substantially similar (e.g., identical) components.

Figure 1:
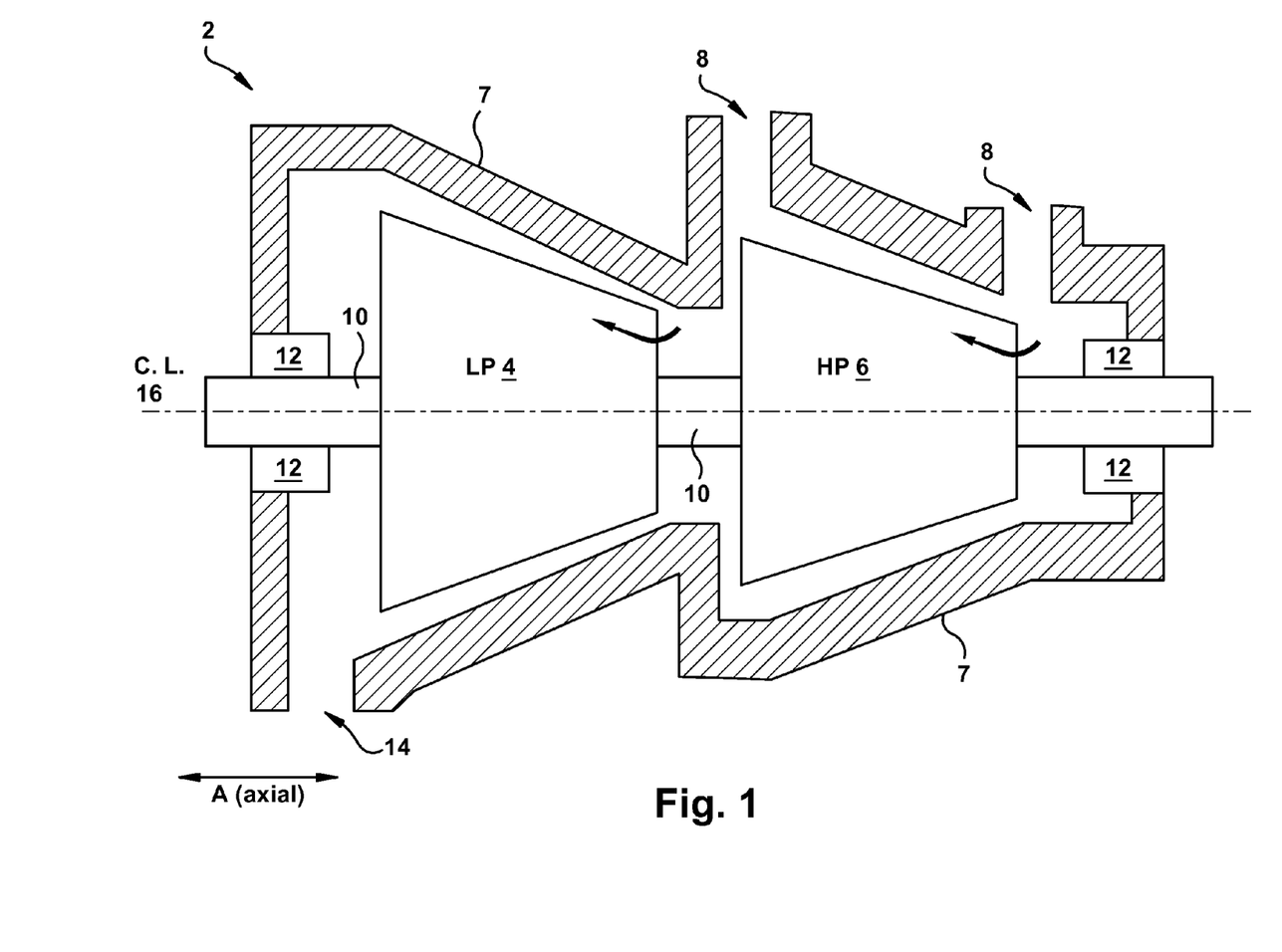
FIG. 1 shows a partial cross-sectional schematic view of steam turbine according to various embodiments.

Turning to FIG. 1, a partial cross-sectional schematic view of steam turbine 2 (e.g., a high-pressure/intermediate-pressure steam turbine) is shown. Steam turbine 2 may include, for example, a low pressure (LP) section 4 and a high pressure (HP) section 6 (it is understood that either LP section 4 or HP section 6 can include an intermediate pressure (IP) section, as is known in the art). The LP section 4 and HP section 6 are at least partially encased in casing 7. Steam may enter the HP section 6 and LP section 4 via one or more inlets 8 in casing 7, and flow axially downstream from the inlet(s) 8. In some embodiments, HP section 6 and LP section 4 are joined by a common shaft 10, which may contact bearings 12, allowing for rotation of the shaft 10, as working fluid (steam) forces rotation of the blades within each of LP section 4 and HP section 6. After performing mechanical work on the blades within LP section 4 and HP section 6, working fluid (e.g., steam) may exit through outlet 14 in casing 7. The center line (CL) 16 of HP section 6 and LP section 4 is shown as a reference point. Both LP section 4 and HP section 6 can include diaphragm assemblies, which are contained within segments of casing 7.

Figure 2:
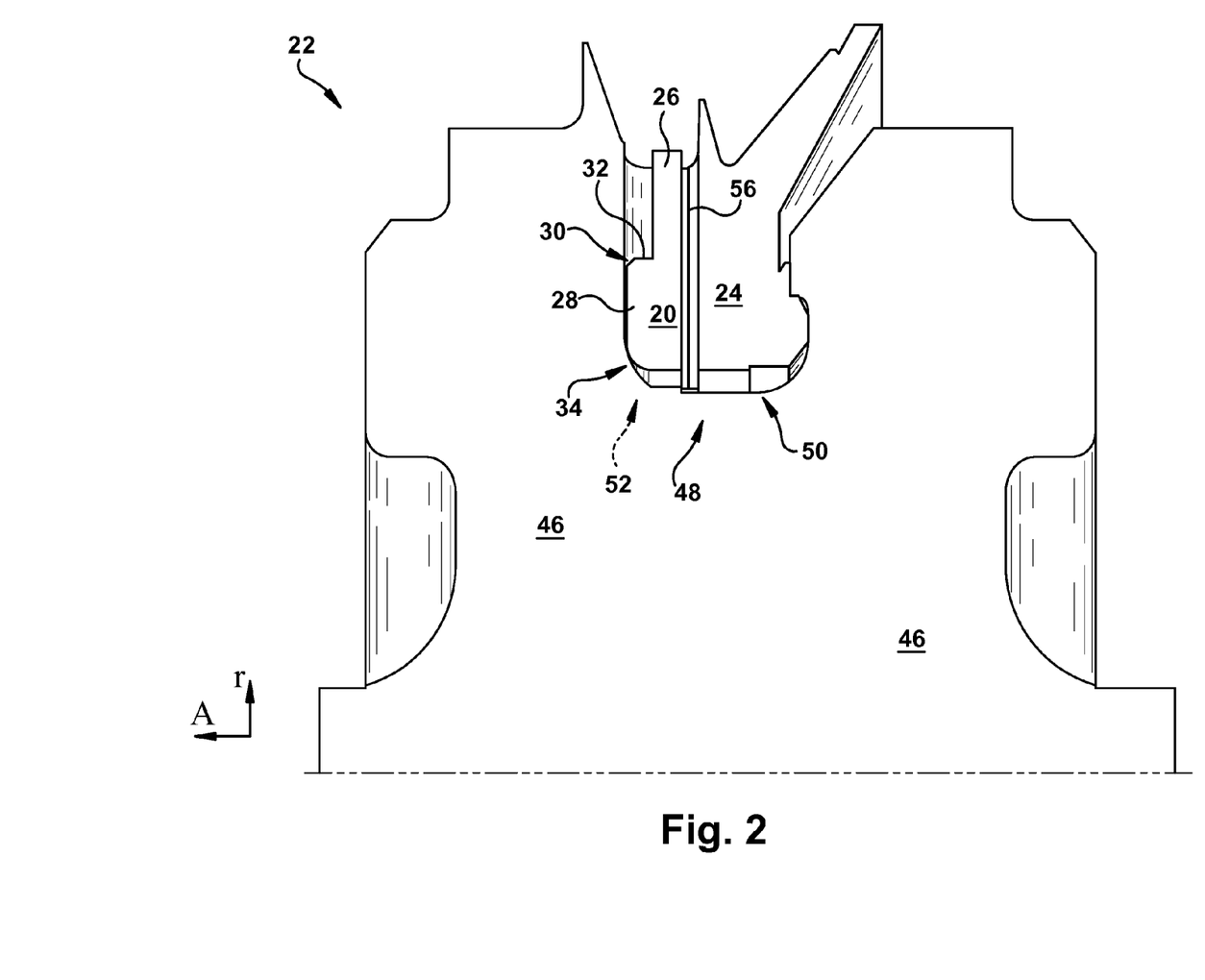
FIG. 2 shows a schematic three-dimensional perspective view of a steam turbine rotor assembly according to various embodiments of the disclosure.
Figure 3:
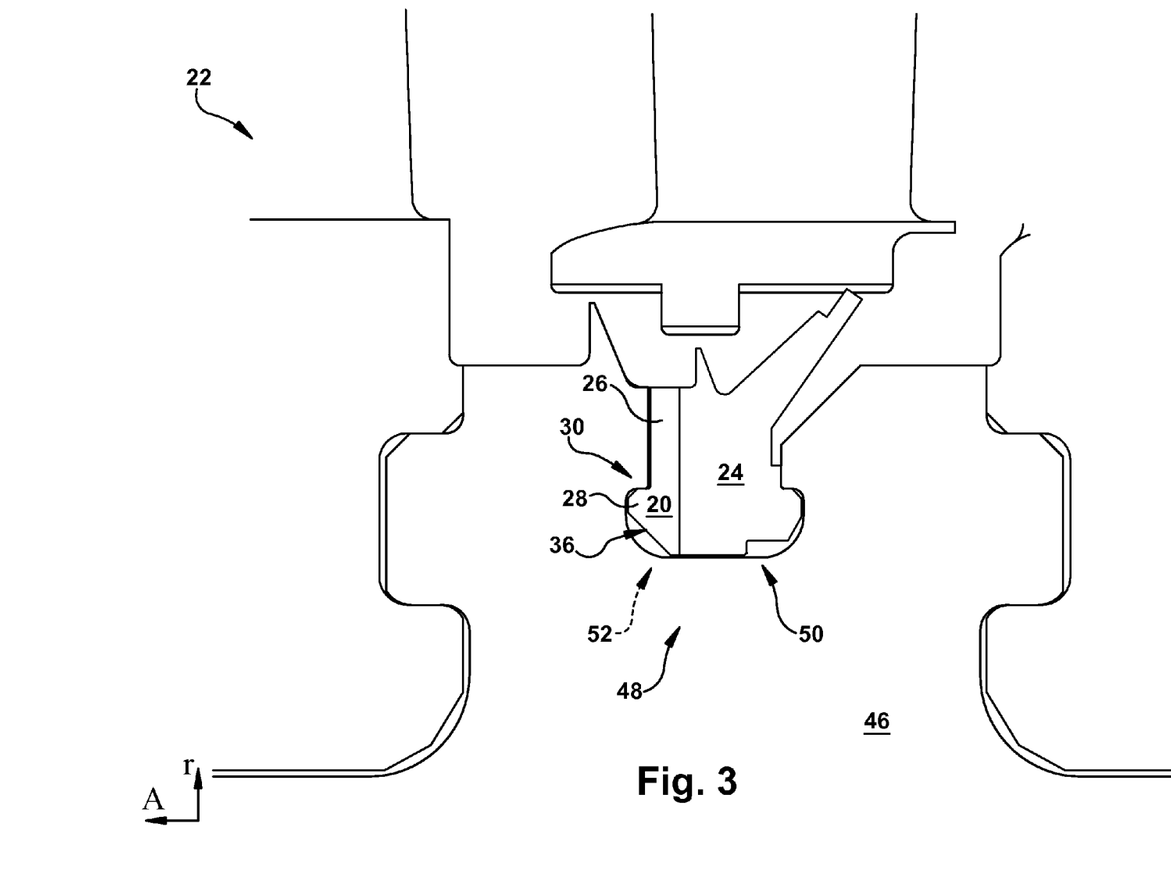
FIG. 3 shows a schematic cut-away view of a steam turbine rotor assembly according to various embodiments of the disclosure.

FIG. 2 shows a schematic three-dimensional perspective view of a rotor key member 20 within a steam turbine rotor assembly (or simply, rotor assembly) 22 according to various embodiments. FIG. 3, which is referred to simultaneously with FIG. 2, shows a schematic cut-away view of the rotor assembly 22 according to various embodiments. As shown in FIG. 2 and FIG. 3, rotor key member 20 is sized (configured) to retain a circumferential seal 24 in a steam turbine (e.g., in a rotor assembly 22 within a steam turbine, such as steam turbine 2). It is understood that the rotor assembly 22 (including circumferential seal 24) can be a component within an HP, IP and/or LP section of a steam turbine (e.g., HP 6, LP 4, etc. section of steam turbine 2). Rotor key member 20 can include: a main body 26 sized to contact an axial face 56 (axially facing surface) of the circumferential seal 24, and a hook 28 extending from main body 26 in a direction axially away from circumferential seal 24. Hook 28 is sized to substantially (e.g., completely or nearly completely) complement a corresponding shelf 30 in rotor body 46 to restrict movement of circumferential seal 24 relative to the rotor body 46 (e.g., to restrict axial and/or radial movement of circumferential seal 24). Hook 28 in some cases extends (e.g., in some cases, substantially perpendicularly (e.g., perpendicular within an acceptable margin of deviation, such as 1-3% deviation) from main body 26. In various embodiments, hook 28 has a first surface 32 sized to contact shelf 30 in rotor body 46, where first surface 32 is rounded or otherwise bulbous to match a correspondingly rounded or otherwise bulbous characteristic of shelf 30, and a second surface 34 (distinct from first surface 32) substantially opposing first surface 32 and located axially inward of first surface 32. In some cases, as shown in the embodiments in FIG. 3, second surface 34 can include a fillet, bevel or chamfer edge 36 extending between main body 26 and hook 28 at second surface 34.

Figure 4:
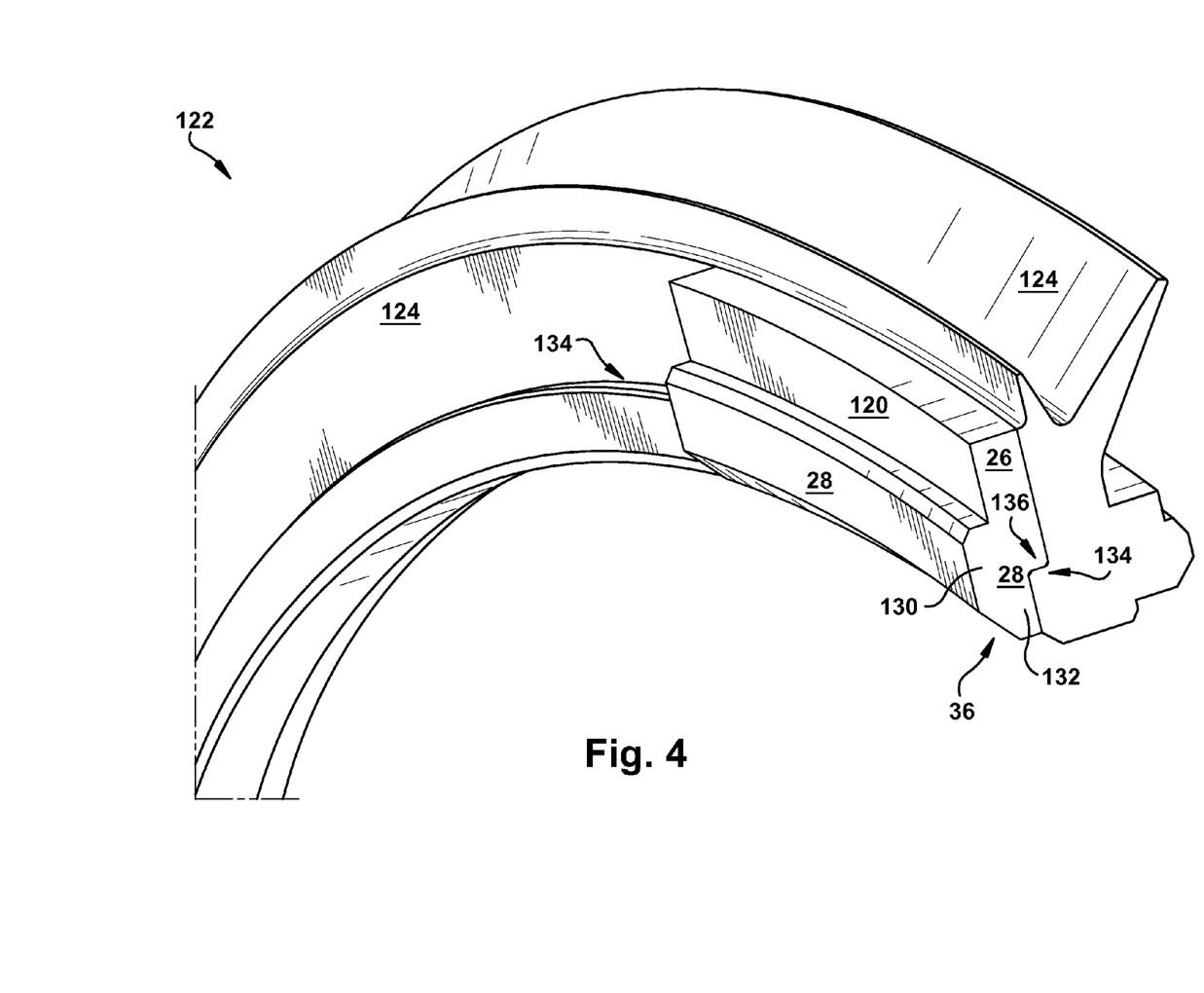
FIG. 4 shows a schematic three-dimensional perspective view of a portion of a steam turbine rotor assembly according to various embodiments of the disclosure.
Figure 5:
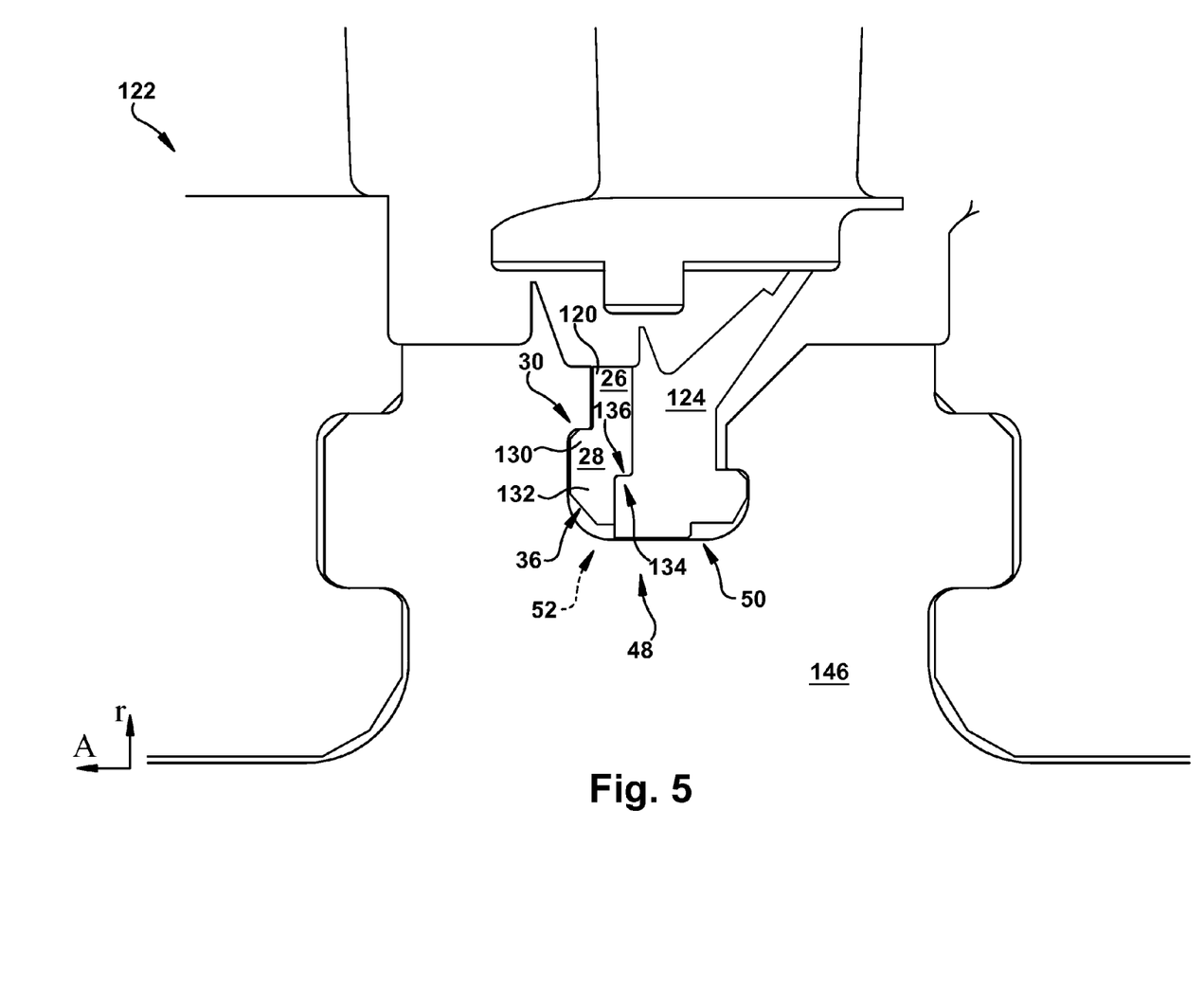
FIG. 5 shows a schematic cut-away view of a steam turbine rotor assembly according to various embodiments of the disclosure.

FIG. 4 shows a three-dimensional perspective view of an alternative embodiment of a portion of a rotor assembly 122, including a rotor key member 120 and a circumferential seal (segment) 124. FIG. 5, which is referred to simultaneously with FIG. 4, shows a schematic cut-away view of the rotor assembly 122 according to various embodiments. As shown in FIG. 4 and FIG. 5, rotor key member 120 can have several features in common with rotor key member 20, while circumferential seal 124 can have several features in common with circumferential seal 24. In some embodiments, hook 28 of rotor key member 120 can include a first portion 130 extending from main body 26 in a direction axially away from circumferential seal 124, and a second portion 132 extending radially inward from first portion 130. In some cases, circumferential seal 124 can include a shelf 134, and the main body 26 and second portion 132 of hook 28 can form a ledge 136 sized to complement (e.g., fit flush with, or nearly flush with) shelf 134 in circumferential seal 124. In some cases, as shown in FIG. 4, shelf 134 in circumferential seal 124 can extend a portion of a circumferential distance about rotor body 46, e.g., a sufficient distance to engage ledge 136. In various embodiments, rotor key member 120 is sized to slide circumferentially into rotor body 46 and engage shelf 30.

In various embodiments, both main body 26 and hook 28 (in rotor key members 20, 120) can be substantially unitary and formed of a common material. This material could include a steel, for example, including approximately 2.5 percent to approximately 12 percent chrome (e.g., INCO 615 or INCO 718). In some cases, rotor key members 20, 120 can be made of a single piece of material, e.g., forged, cast, molded or otherwise formed from a common material.

Figure 6:
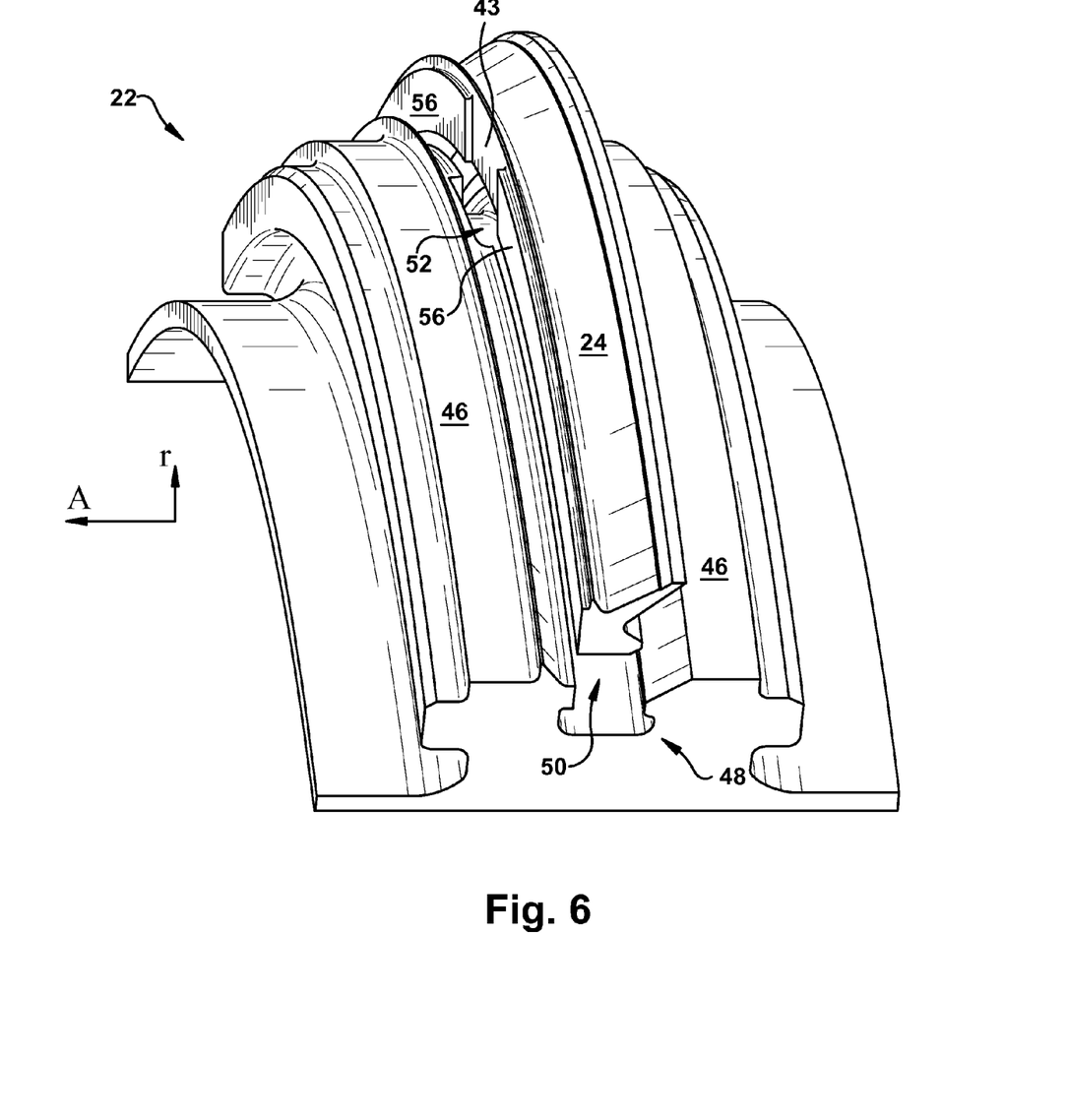
FIG. 6 shows a schematic three-dimensional perspective view of a portion of a steam turbine rotor assembly according to various embodiments of the disclosure.
Figure 7:
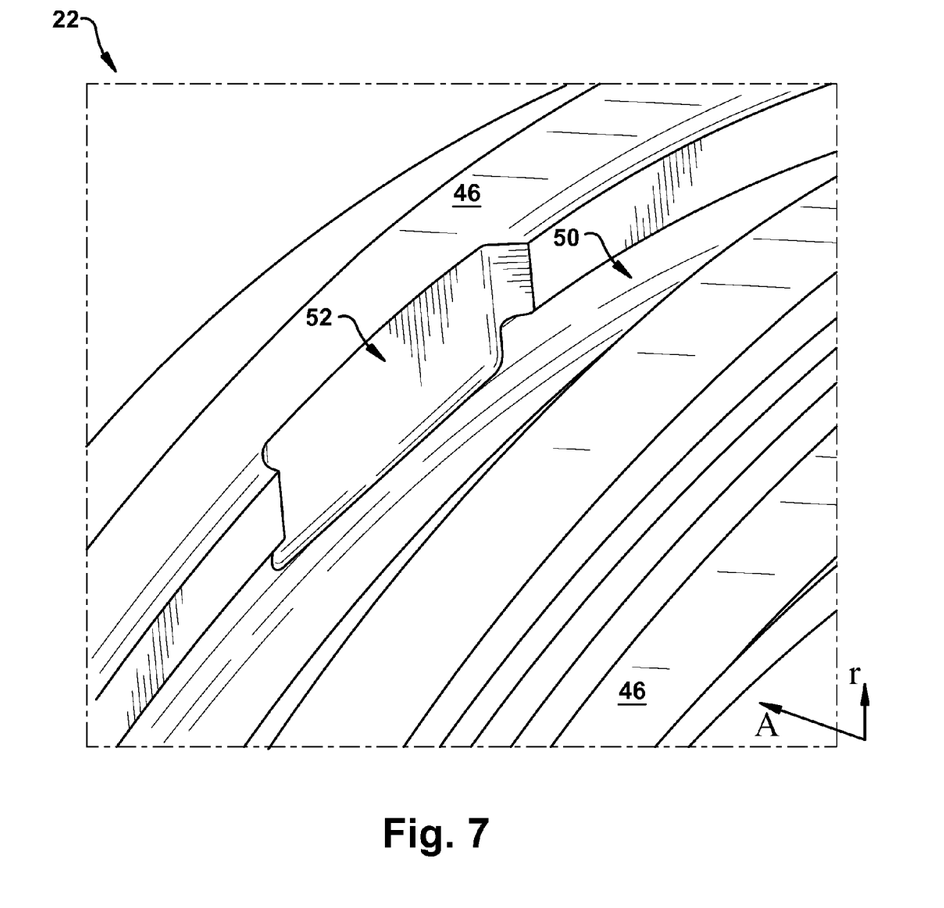
FIG. 7 shows a three-dimensional perspective view of a portion of the rotor assembly of FIG. 6, excluding the circumferential seal member, according to various embodiments of the disclosure.
Figure 8:
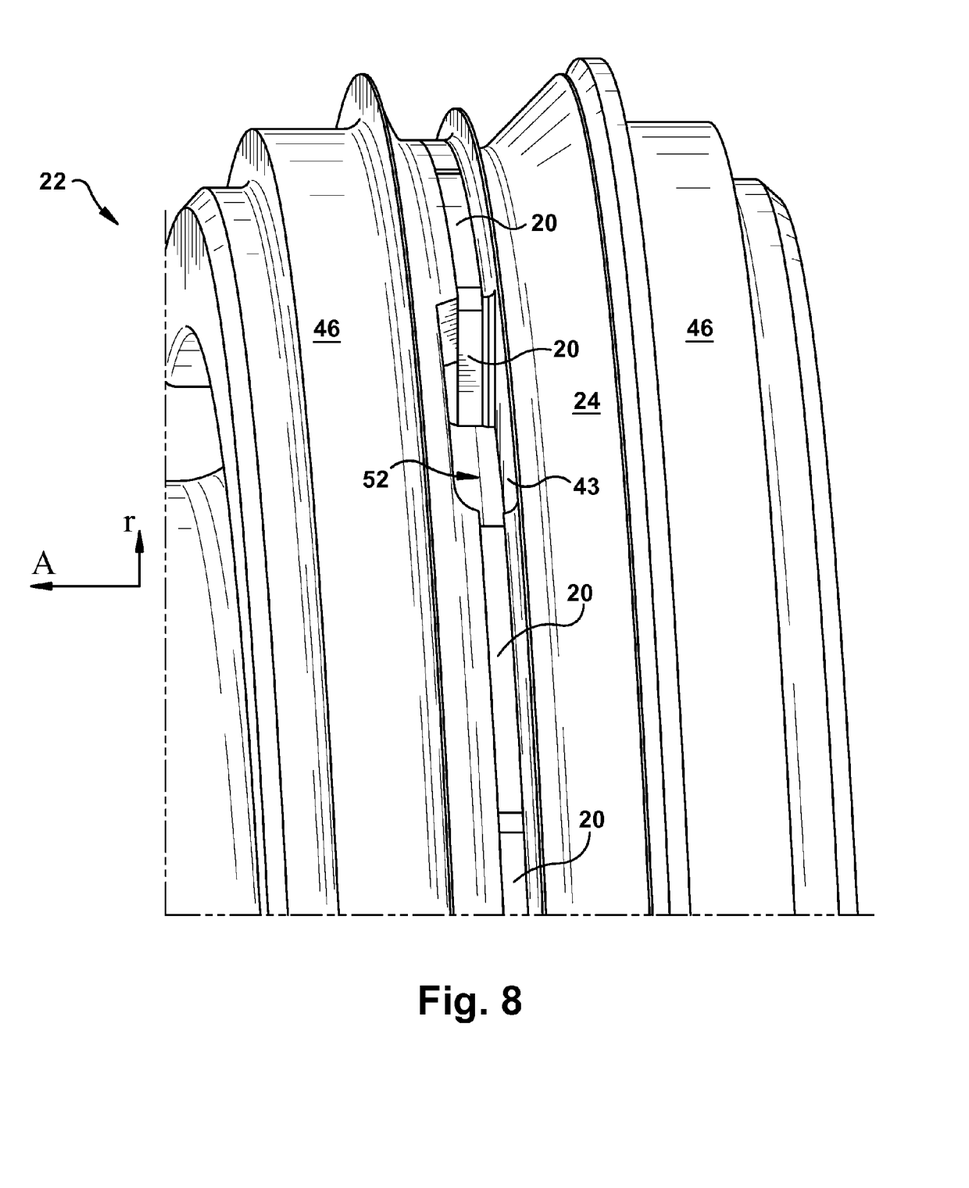
FIG. 8 shows a three-dimensional perspective view of a portion of a rotor assembly according to various embodiments of the disclosure.
Figure 9:
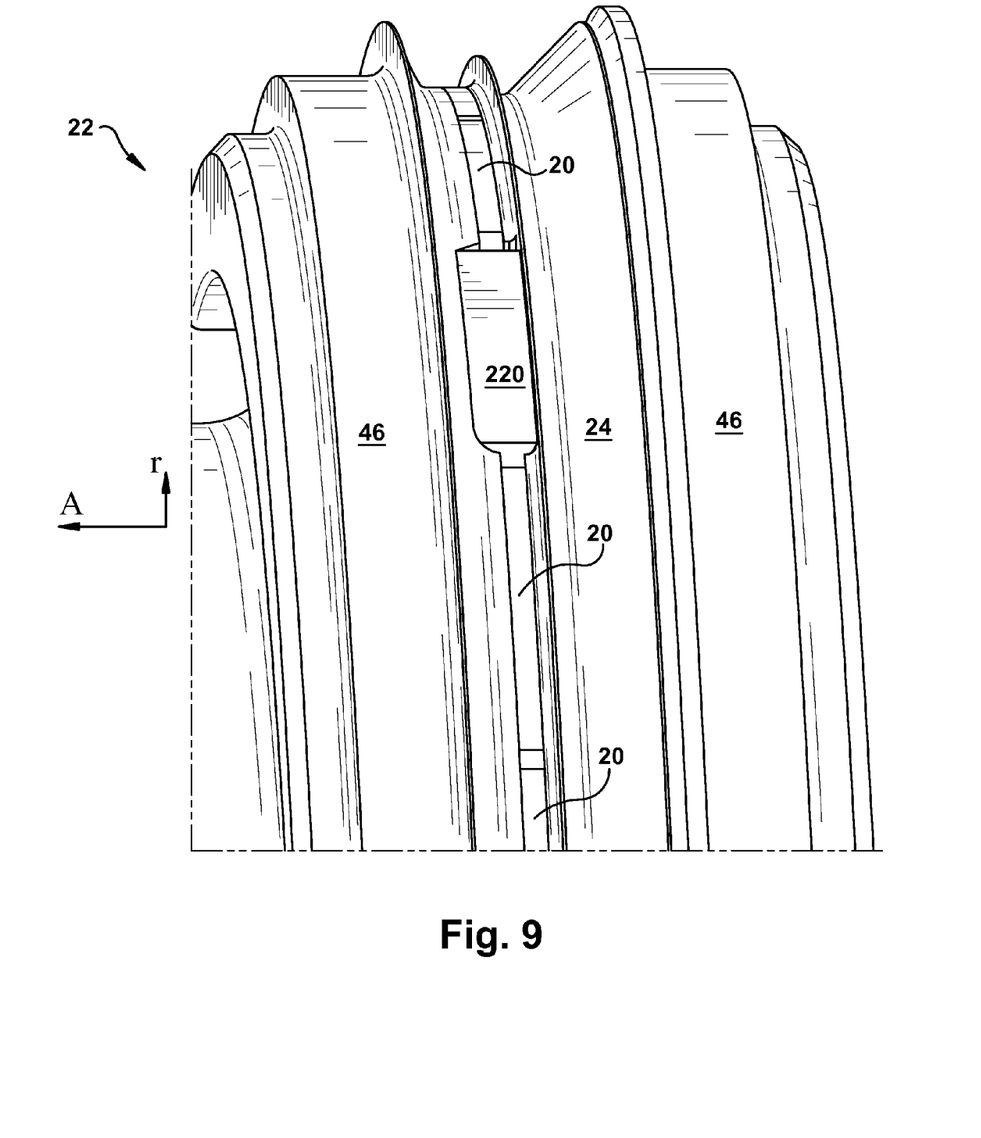
FIG. 9 shows a three-dimensional perspective view of a rotor assembly according to various embodiments of the disclosure.

FIG. 6 shows a schematic three-dimensional perspective view of the rotor assembly 22 of FIG. 3, excluding rotor key member 20. FIG. 7 shows a three-dimensional perspective view of a portion of rotor assembly 22, excluding circumferential seal 24 and rotor key member 20. FIG. 8 shows a three-dimensional perspective view of a portion of rotor assembly 22, including rotor key member 20, as described herein. FIG. 9 shows the rotor assembly 22 of FIG. 8, further including a second rotor key member 220.

Returning to FIG. 3, but with continuing reference to FIGS. 6-9, rotor assembly 22 is shown including a rotor body 46 having a slot 48 extending substantially entirely circumferentially about a primary axis (A) of the rotor body 46 (primary axis A corresponding with axis of rotation of steam turbine). Slot 48 can include a primary slot 50 extending substantially an entire circumferential distance about rotor body 46, and a secondary slot 52 (FIGS. 6, 7, 8) extending axially from primary slot 50 and spanning only a portion of the circumferential distance about rotor body 46. As shown in FIG. 3, rotor assembly 22 can further include circumferential seal 24 within primary slot 50, spanning substantially the entire circumferential distance about rotor body 46 (e.g., in sections or as one continuous piece of material). FIG. 9 illustrates an additional component in rotor assembly 22, including second rotor key member 220 in secondary slot 52, circumferentially retaining rotor key member 20 (or, rotor key member 120) within primary slot 50. Both second rotor key member 220 and rotor key member 20 (or, rotor key member 120) contact axial face 56 of circumferential seal 24. As shown in FIG. 9, second rotor key member 220 is located within (and substantially fills) secondary slot 52, and contacts axial face 56 of circumferential seal 24. Rotor key member 220 may be sized to slide (radially) into or out of secondary slot 52 to lock rotor key member(s) 20, 120, e.g., using among other things, a hook, a weld, or other coupling mechanism. Rotor key member 220 can be inserted/removed from secondary slot 52 in order to lock/unlock rotor key member(s) 20, 120 (and in turn, circumferential seal 24). As shown in FIG. 6 and FIG. 8, in some embodiments, circumferential seal 24 can include a recess 43 extending only partially circumferentially, marking a break between adjacent segments of axial face 56. In some cases, this recess 43 can be sized to accommodate second rotor key member 220, and coincide with secondary slot 52. As noted herein, second rotor key member 220 is sized (configured) to retain the (first) rotor key member 20 (or rotor key member 120) in primary slot 50, where second rotor key member 220 is sized to substantially fill secondary slot 52 and restrict circumferential movement of the circumferential seal 24. In various embodiments, rotor key member 20 (and/or rotor key member 120, which may be interchanged in various embodiments described herein), can be sized to pass radially through secondary slot 52 and circumferentially into primary slot 50 to engage shelf 30 in the primary slot 50 and contact the circumferential seal 24.

It is understood that according to various embodiments, rotor key members (and rotor assemblies) described herein can be utilized in a plurality of stages within a steam turbine, and can aid in both assembly/disassembly of circumferential seal components, as well as reduce wear and complications from component failure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rotor key member for radially retaining a circumferential seal in a steam turbine rotor body, the rotor key member comprising:
   a main body sized to contact an axial face of the circumferential seal; and
   a hook extending from the main body in a direction axially away from the circumferential seal, the hook sized to substantially complement a corresponding shelf in the steam turbine rotor body to restrict movement of the circumferential seal relative to the steam turbine rotor body,
   wherein the hook includes a first portion extending from the main body in the direction axially away from the circumferential seal, and a second portion extending radially inward from the first portion.

2. The rotor key member of claim 1, wherein the main body and the second portion form a ledge sized to complement a corresponding shelf in the circumferential seal.

3. The rotor key member of claim 1, wherein the main body and the hook are unitary and formed of a common material.

4. The rotor key member of claim 3, wherein the common material includes steel.

5. The rotor key member of claim 1, wherein the hook has a first surface sized to contact the shelf in the steam turbine rotor body, the rotor key member further comprising a fillet, bevel or chamfer edge extending between the main body and the hook at a second surface of the hook distinct from the first surface.

6. A steam turbine rotor assembly comprising:
   a rotor body having a slot extending substantially entirely circumferentially about a primary axis of the rotor body, the slot including:
      a primary slot extending substantially an entire circumferential distance about the rotor body; and
      a secondary slot extending axially from the primary slot and spanning only a portion of the circumferential distance about the rotor body;
   a circumferential seal within the primary slot spanning substantially the entire circumferential distance about the rotor body;
   a set of seal retaining members within the primary slot contacting an axial face of the circumferential seal; and
   a first rotor key member having:
      a main body sized to contact an axial face of the circumferential seal; and
      a hook extending from the main body in a direction axially away from the circumferential seal, the hook sized to substantially complement a corresponding shelf in the primary slot,
   wherein the first rotor key member is sized to pass radially through the secondary slot and circumferentially into the primary slot to engage the shelf in the primary slot and contact the circumferential seal.

7. The steam turbine rotor assembly of claim 6, further comprising a second rotor key member for retaining the first rotor key member in the primary slot, the second rotor key member sized to substantially fill the secondary slot and restrict circumferential movement of the circumferential seal.

8. The steam turbine rotor assembly of claim 6, wherein the hook includes a first portion extending from the main body in the direction axially away from the circumferential seal, and a second portion extending radially inward from the first portion.

9. The steam turbine rotor assembly of claim 8, wherein the main body and the second portion form a ledge sized to complement a corresponding shelf in the circumferential seal.

10. The steam turbine rotor assembly of claim 6, wherein the main body and the hook are unitary and formed of a common material.

11. The steam turbine rotor assembly of claim 6, wherein the hook has a first surface sized to contact the shelf in the rotor body, the rotor key member further comprising a fillet, bevel or chamfer edge extending between the main body and the hook at a second surface of the hook distinct from the first surface.

12. A steam turbine comprising:
a casing; and
a rotor assembly at least partially contained within the casing, the rotor assembly having:
a rotor body having a slot extending substantially entirely circumferentially about a primary axis of the rotor body, the slot including:
a primary slot extending substantially an entire circumferential distance about the rotor body; and
a secondary slot extending axially from the primary slot and spanning only a portion of the circumferential distance about the rotor body;
a circumferential seal within the primary slot spanning substantially the entire circumferential distance about the rotor body;
a set of seal retaining members within the primary slot contacting an axial face of the circumferential seal; and
a first rotor key member having:
a main body sized to contact an axial face of the circumferential seal; and
a hook extending from the main body in a direction axially away from the circumferential seal, the hook sized to substantially complement corresponding shelf in the primary slot,
wherein the first rotor key member is sized to pass radially through the secondary slot and circumferentially into the primary slot to engage the shelf in the primary slot and contact the circumferential seal.

13. The steam turbine of claim 12, further comprising a second rotor key member for retaining the first rotor key member in the primary slot, the second rotor key member sized to substantially fill the secondary slot and restrict circumferential movement of the circumferential seal.

14. The steam turbine of claim 12, wherein the hook includes a first portion extending from the main body in the direction axially away from the circumferential seal, and a second portion extending radially inward from the first portion.

15. The steam turbine rotor assembly of claim 14, wherein the main body and the second portion form a ledge sized to complement a corresponding shelf in the circumferential seal.

16. The steam turbine of claim 12, wherein the main body and the hook are unitary and formed of a common material.

17. The steam turbine of claim 12, wherein the hook has a first surface sized to contact the shelf in the rotor body, the rotor key member further comprising a fillet, bevel or chamfer edge extending between the main body and the hook at a second surface of the hook distinct from the first surface.

* * * * *